United States Patent [19]
Kojima

[11] Patent Number: 4,878,925
[45] Date of Patent: Nov. 7, 1989

[54] APPARATUS FOR REMOVING FOREIGN SUBSTANCES IN GAS

[76] Inventor: Hisao Kojima, 3-53-21, Shioiri-cho, Tsurumi-ku, Yokohama-shi, Kanagawa, Japan

[21] Appl. No.: 146,025

[22] Filed: Jan. 20, 1988

[30] Foreign Application Priority Data

Jan. 22, 1987 [JP] Japan .................................. 62-11227

[51] Int. Cl.⁴ ............................................. B01D 47/00
[52] U.S. Cl. ..................................... 55/235; 366/339; 138/38; 55/71; 55/259
[58] Field of Search .................... 55/337, 71, 456, 457, 55/435, 259, 235; 366/339; 138/38

[56] References Cited

U.S. PATENT DOCUMENTS

| | | | |
|---|---|---|---|
| 680,717 | 8/1901 | Labadie | 55/457 |
| 735,192 | 8/1903 | Allert | 55/456 |
| 2,232,913 | 2/1941 | Heuberger | 55/457 |
| 3,813,854 | 6/1974 | Hortman | 55/457 |
| 4,466,741 | 8/1984 | Kojima | 366/339 |

*Primary Examiner*—Bernard Nozick
*Attorney, Agent, or Firm*—Jones, Tullar & Cooper

[57] ABSTRACT

A blade is formed integrally on the inner peripheral surface of a cylindrical passage tube, thus constituting an element. A porous or meshed auxiliary body is disposed on the surface of the blade or the inner peripheral surface of the passage tube. The auxiliary body serves to increase the area in contact with the gas flowing through the element and to accelerate capture of particulates in the gas.

26 Claims, 5 Drawing Sheets

APPARATUS FOR REMOVING FOREIGN SUBSTANCES IN GAS

BACKGROUND OF THE INVENTION

The present invention relates to an apparatus for removing foreign substances in gas, such as a dust collector for removing particulates from exhaust gas.

During processes of manufacturing optical fibers or silicon wafers, particulates of $SiO_2$ and other substances are mixed with exhaust gas. In the manufacture of semiconductors by the chemical vapor-phase deposition or the like, powdery mists of Sb, B, As, Ge, etc., exist in exhaust gas. When refining aluminum, metal dust of aluminum or the like is mixed with exhaust gas.

Conventionally, these particulates in exhaust gas are removed by means of dry-type dust collectors, such as centrifugal dust collectors, electric dust collectors, etc., or wet-type dust collectors, such as Venturi scrubbers, etc.

These prior art dust collectors, however, are subject to a defect such that their collection efficiency is low for particulates with the particle size of 10 $\mu$m or less. Moreover, they entail high equipment costs and require complicated maintenance work. The Venturi scrubbers, in particular, suffer so great a pressure loss that they consume considerable electric power. Thus, they require a large-sized power source, which is expensive.

SUMMARY OF THE INVENTION

The object of the present invention is to provide an apparatus for removing foreign substances in gas, entailing only low equipment and running costs and capable of highly efficiently collecting even very fine particulates with the particle size of 1 $\mu$m or less.

According to the present invention, there is provided an apparatus for removing foreign substances in a gas, which comprises a passage tube through which the gas flows; a blade dividing the inside of the passage tube, thereby forming a plurality of gas passages; and an auxiliary body disposed on at least part of the area constituted of the inner peripheral surface of the passage tube and the surface of the blade, the area of the auxiliary body which contacts with the gas being larger than the aforesaid part.

In the apparatus of the invention described above, when the gas, such as exhaust gas, is caused to flow through the passage tube, it advances spirally through the gas passages divided by the spiral blade. Particulates in the gas become coarser by repeatedly running against one another and by touching the wide surface of the auxiliary body. Thus, the particulates in the gas are reduced in number, and can be removed by passing the gas, discharged from the passage tube, through water, for example. Alternatively, if a liquid, such as water or a detergent solution, or a slurry is injected into the passage tube, the particulates in the spirally advancing gas can be captured by the liquid or slurry and removed from the gas. In this case, the surface area of the auxiliary body, which is meshed or porous, is so wide that the contact area between the gas and the liquid can be extended by the use of the auxiliary body. Accordingly, the gas-liquid contact efficiency is high, and the foreign substances (e.g., particulates of dust, mists, etc.) in the gas can be removed with high efficiency. In particular, the apparatus of the invention can highly effectively remove those very fine particulates with the particle size of 1 $\mu$m or less which cannot be removed by means of the conventional dust collectors. Thus, the collection efficiency for particulates is high. The present invention can be widely applied to any other apparatuses for removing foreign substances in gas than dust collectors, such as apparatuses for removing malodorous substances in gas.

DETAILED DESCRIPTION OF THE PREFERRED EMBODIMENTS

Figure 1:
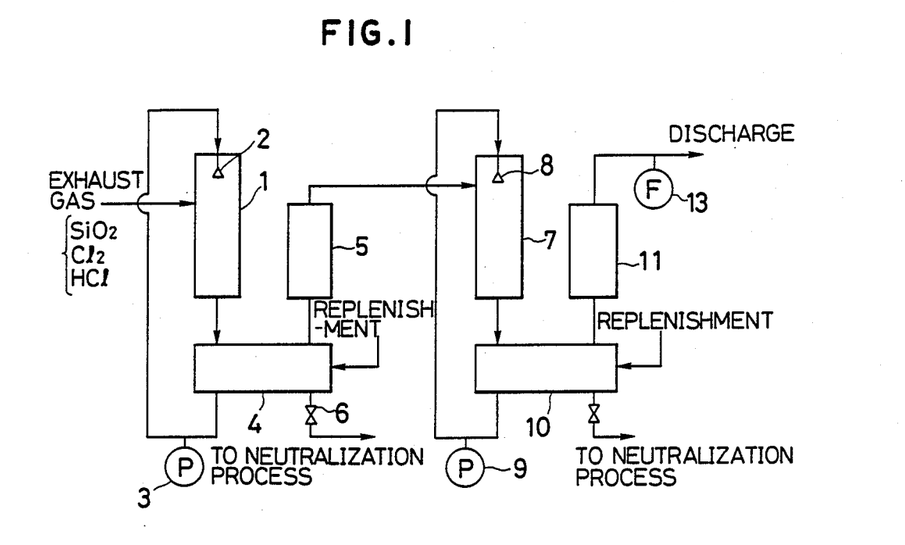
FIG. 1 is a block diagram showing an exhaust emission control apparatus to which is applied a removing apparatus according to a first embodiment of the present invention.

FIG. 1 is a block diagram showing an exhaust emission control apparatus to which is applied a removing apparatus according to a first embodiment of the present invention. This control apparatus serves to remove foreign substances, such as particulates of $SiO_2$ or the like, and mists of chlorine or hydrochloric acid, from exhaust gas. The exhaust gas is introduced into removing apparatus 1 according to the first embodiment of the invention. Apparatus 1 is coupled with tank 4 disposed below the same. Tank 4 is connected to gas-liquid separator 5, such as a demister, cyclone, or filling tower. Gas is separated from a liquid in separator 5, and the liquid bodies are returned to tank 4. The exhaust gas from separator 5 is passed through second removing apparatus 7, which resembles removing apparatus 1. Thus, further foreign substances are removed from the exhaust gas. Apparatus 7 is coupled with tank 10 which is connected to gas-liquid separator 11. Exhauster 13 is disposed on the exhaust side of separator 11. When valve 12 is opened as required, a water solution in tank 10 is discharged for a process of neutralization. At the same time, tank 10 is replenished with a fresh solution as required.

Removing apparatuses 1 and 7 are provided, at their top portion, with spray nozzles 2 and 8, respectively. The liquids in tanks 4 and 10 are supplied to nozzles 2 and 8 by means of pumps 3 and 9, respectively. Thus, the liquids injected into removing apparatuses 1 and 7 by nozzles 2 are 8, and then collected into tanks 4 and 10, respectively. Thereafter, the liquids are fed again to nozzles 2 and 8 for circulation by pumps 3 and 9.

Figure 2:
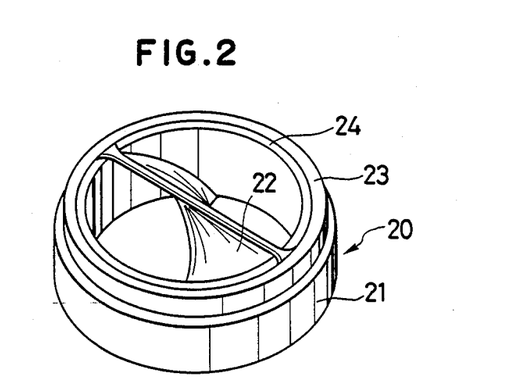
FIG. 2 is a perspective view showing an element of the removing apparatus according to the first embodiment of the invention.
Figure 3:
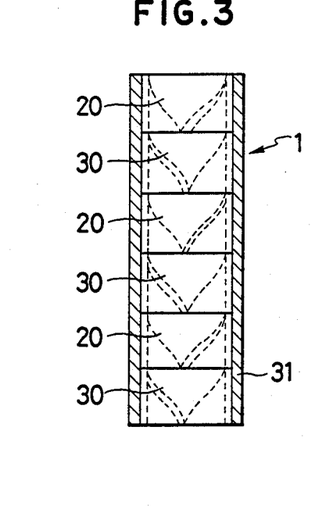
FIG. 3 is a sectional view of the removing apparatus.
Figure 4:
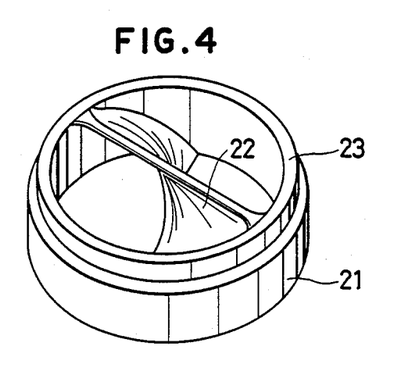
FIG. 4 is a perspective view showing a passage tube and a blade of the element.

A specific arrangement of removing apparatus 1 will now be described. Since removing apparatus 7 has the same construction as apparatus 1, a description of its arrangement is omitted herein. Apparatus 1 is formed by connecting a plurality of elements 20 and 30 (one element 20 of which is shown in FIG. 2) in their longitudinal direction, as shown in FIG. 3. As shown in FIG. 4, each element 20 includes passage tube 21 and a spiral blade 22 located inside tube 21. More specifically, blade 22 is disposed inside cylindrical passage tube 21 so as to be twisted clockwise through 90° with respect to the longitudinal direction of tube 21. Tube 21 and blade 22 may be formed of metal, such as aluminum, stainless steel, carbon steel, nickel, copper, titanium, etc., ceramics, or plastics. These two members may be formed integrally or separately. If they are formed separately, they are joined together by welding or brazing. If tube 21 and blade 22 are formed integrally, however, they can be manufactured more easily and without entailing any protuberances such as weld beads. In this case, therefore, the fluids can be prevented from stagnating unusually. Preferably, the end edge of blade 22 is rounded so that the flow resistance of the fluids can be reduced. Also, the fluids can be prevented from stagnating at a boundary portion between the blade and the passage tube by rounding the boundary portion. Inner ring-shaped projection 23 and an outer ring-shaped projection (not shown) for coupling the elements to each other are formed on two opposite end edges of the passage tube, with respect to the longitudinal direction thereof. As the inner projections are fitted in the outer projections, the elements are coupled to one another.

Figure 5A:
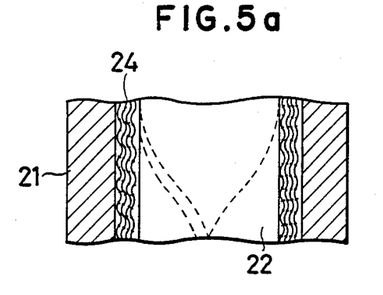
FIGS. 5a to 5f are sectional views showing various modifications of an auxiliary body of the element.

A meshed body 24 with a predetermined thickness, for use as an auxiliary body, is disposed along the inner peripheral surface of passage tube 21. Meshed body 24 may be fixed by being bonded to the inner peripheral surface of passage tube 21, as shown in FIG. 5a, or by being clamped between the inner peripheral surface of tube 21 and clamp rings (not shown) at both ends of the tube with respect to the longitudinal direction thereof. Instead of being disposed along the inner peripheral surface of passage tube 21, as shown in FIG. 5a, the auxiliary body may be formed along the surface of the blade.

Meshed body 24 may be a two- or three-dimensional intertwined structure formed of fibers of plastic material, metal, ceramic material, glass, carbon, or a composite of any of these materials. If metal fibers are used for the material, the intertwined structure is preferably sintered. Meshed body 24 has a very wide area in contact with the exhaust gas passing through passage tube 21.

Figure 5B:
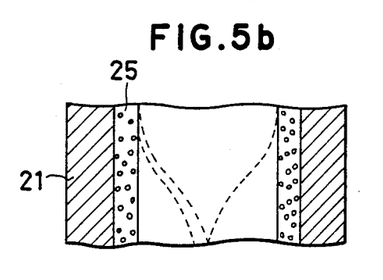
Figure 5C:
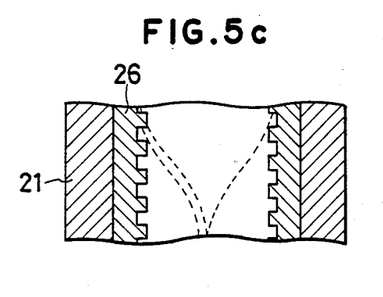

The auxiliary body is not limited to meshed body 24 shown in FIG. 5a, and may be formed of various other structures. For example, porous body 25 shown in FIG. 5b or indented body 26 shown in FIG. 5c may be used as the auxiliary body. The porous and indented bodies may be formed by sintering, molding, pressing, or some other method, also using plastic material, metal, ceramic material, glass, or carbon. The porous body, in particular, preferably has a number of fine perforations which serve to increase an area in contact with the gas. If the porous body is formed of metal or plastic material, foaming metal or foaming plastic material can be used for the purpose. Projections of indented body 26 may have various shapes, e.g., rectangular, triangular, or circular configurations. Like meshed body 24, porous body 25 and indented body 26 have a wide surface area, so that the gas contact area along the inner peripheral surface of the passage tube can be extended.

Figure 5D:
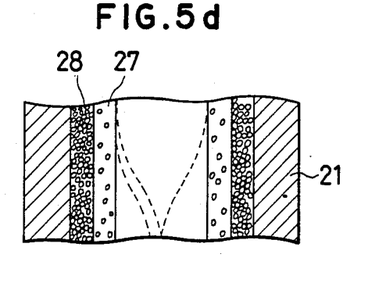
Figure 5E:
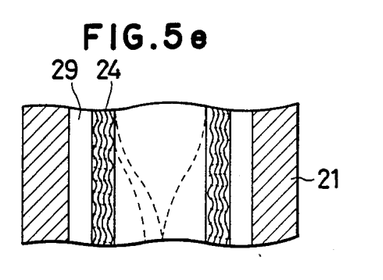
Figure 5F:
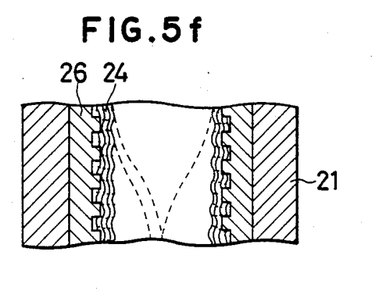

As shown in FIG. 5d, moreover, the auxiliary body may be formed of a laminate structure which includes fine porous body 28 having fine pores and coarse porous body 27 having larger pores. Body 28 is fixed to the inner peripheral surface of passage tube 21, while body 27 is fixed to the inside of body 28. According to this arrangement, relatively coarse particulates in the gas are captured by coarser body 27, and then relatively fine particulates in the gas are caught by finer body 28. Thus, particulates of various sizes can be removed with a very high efficiency. As shown in FIG. 5e, moreover, gap 29 may be provided between meshed body 24 and passage tube 21. An element with such a gap may be suitably used to remove mists of oil or water, if any, in the exhaust gas. As shown in FIG. 5f, furthermore, indented body 26 may be fixed to the inner peripheral surface of passage body 21 so that meshed body 24 is provided on the indented surface of body 26. By doing this, the area in contact with the gas can be widened to increase the efficiency of dust collection.

Although element 20 is of a right-handed type, as shown in FIGS. 2 and 4, element 30 shown in FIG. 3 has a left-handed blade. As shown in FIG. 3, removing apparatus 1 comprises right-handed elements 20 and left-handed elements 30 which are arranged alternately. These elements are coupled by means of ring-shaped projections 23 and the like, and are inserted in pipe 31. In this arrangement, elements 20 and 30 are positioned so that the adjacent end edges of their blades cross at right angles at the joints.

In a dust collector to which are applied removing apparatuses 1 and 7 constructed in this manner, the exhaust gas, containing particulates of $SiO_2$ and mists of chlorine ($Cl_2$) and hydrochloric acid (HCl), is fed into removing apparatus 1 through the top portion thereof. Also, the water solution drawn up from tank 4 by means of pump 3 is injected into apparatus 1 through spray nozzle 2. The gas and the solution spirally rotate right-handed through 90° as they flow through first-stage element 20 of apparatus 1. The exhaust gas and the water solution are separated at the diverging point between first-stage element 20 and second-stage element 30, and join the gas and the solution passed through the other fluid passages, respectively. Then, the gas and the solution, separated and joined in this manner, spirally rotate left-handed through 90° as they flow through second-stage element 30. In this manner, the exhaust gas and the water solution repeat separation, joining, and spiral rotations (reversal) in opposite directions as they flow through removing apparatus 1. Thus, the gas and the liquid are mixed and brought into contact with each other. Meanwhile, the water solution sticks to the meshed surfaces of meshed bodies 24 which are provided individually on the inner peripheral surfaces of elements 20 and 30. The sticking solution comes into contact with the particulates in the exhaust gas. Thereupon, the particulates are captured by the solution, and are then collected, together with the solution, into tank 4 which is located below. While the very fine particulates of $SiO_2$ in the exhaust gas, having a particle size of 10 μm or less, are flowing through removing apparatus 1, they grow and become so coarse that they can be easily captured by the water solution. Further, the mists of chlorine and hydrochloric acid in the exhaust gas is dissolved in the solution. Thus, drops of the water solution, containing the particulates and mists, fall into tank 4 to be collected and stored therein. Spray nozzle 2 may be attached to the central portion of removing apparatus 1, as well as to the top portion thereof. With this arrangement, the efficiency of gas-liquid mixture increases.

The exhaust gas is fed to gas-liquid separator 5, where small splashes in the gas flow are separated between gas and liquid, and the liquid is returned to tank 4. The efficiency of collection of the particulates and mists can be further increased by injecting the water solution into separator 5 through the spray nozzle which is attached to the top or bottom portion of the separator.

The water solution in tank 4 is circulated for repeated use by means of pump 3. If the solution in tank 4 contains mists of hydrochloric acid and the like at a high concentration, it is discharged as required for the process of neutralization by opening valve 6. Tank 4 is replenished with a fresh solution as required.

Subsequently, the exhaust gas is supplied to removing apparatus 7 for a secondary process. In apparatus 7, a water solution of alkali, such as NaOH, is injected into elements 20 and 30 through nozzle 8. Accordingly, the exhaust gas and the solution are brought into contact and mixed together, and the particulates of $SiO_2$ remaining in the exhaust gas are touched and captured by the alkaline water solution. Thus, the residual particulates are dissolved and collected in the solution. Meanwhile, the mists of chlorine and hydrochloric acid are captured by the alkaline water solution through chemical reaction. The solution is collected in tank 10, and circulated for repeated use by means of pump 9. After the exhaust gas is delivered from tank 10, the liquid component in the gas is separated and removed by means of gas-liquid separator 11, and is then returned to tank 10. The clean exhaust gas, cleared of the particulates and mists, is discharged into the outside space by exhauster 13.

According to the apparatuses constructed in this manner, the particulates in the exhaust gas can be removed with high efficiency. In particular, removing apparatuses 1 and 7 can highly efficiently capture very fine particulates with the particle size of 1 μm or less, which cannot be removed by means of the conventional dust collectors. Since each removing apparatus is composed of a plurality of elements coupled together, moreover, it is simple in construction and permits reduction in size. Also the apparatus is free of clogging, so that it can be maintained with ease. Since the meshed body extends along the inner peripheral surface of the passage tube, the exhaust gas flowing through the elements is subject to only a small pressure loss. Thus, the exhauster 13 need not have a large capacity.

It is to be understood that the elements are not limited to the arrangement of the aforementioned embodiment, in which the right- and left-handed elements are located alternately so that the facing end edges of their blades extend at right angles. For example, a pair of right-handed elements are coupled so that the facing end edges of their blades extend parallel to each other. Likewise, a pair of left-handed elements are coupled so that the facing end edges of their blades extend parallel to each other. Further, these right- and left-handed elements are coupled together so that the facing end edges of their respective blades extend at right angles. In this arrangement, the exhaust gas advances spirally through 180°, and is then reversed to flow spirally through 180° in the opposite direction. Alternatively, a pair of right-handed elements and a pair of left-handed elements may be coupled together so that the facing end edges of each two adjacent elements extend at right angles.

Furthermore, a coupled structure, composed of a plurality of blades connected in series and welded together, may be inserted in an elongated passage tube to form an element.

It is to be understood, moreover, that each element used to constitute the removing apparatus is not limited to the arrangements of 90°-twisted, right-handed element 20 shown in FIG. 2 and 90°-twisted, left-handed element 30 shown in FIG. 3.

Figure 6:
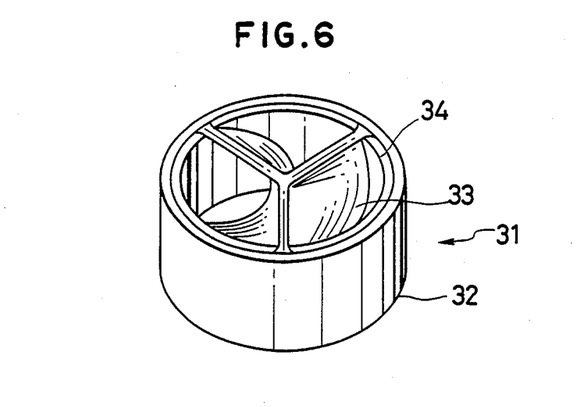
FIG. 6 is a perspective view of an element having three blades.

In element 31 shown in FIG. 6, for example, blade 3, which is composed of three blade members, is disposed inside passage tube 32. Auxiliary body 34 is located along the inner peripheral surface of tube 32. The individual blade members of blade 33 are arranged at regular intervals of 120° around the axis of passage tube 32. Each blade member is spirally twisted right-handed through 90°, with respect to the longitudinal direction of passage tube 32. Thus, with use of element 31 in which passage tube 32 is internally divided into three fluid passages, the effect of mixture of flowing gases can be increased.

Figure 7:
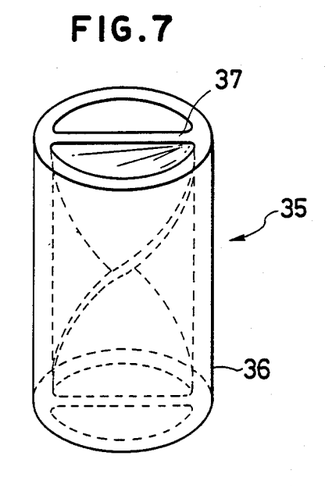
FIG. 7 is a schematic perspective view of a 180°-twisted, right-handed element.

As shown in FIG. 7, moreover, element 35 may be used in which blade 37 twisted right-handed (clockwise) through 180°, with respect to the longitudinal direction of passage tube 36, is disposed inside tube 36. Also available is an element in which blade 37 is replaced with a 180°-twisted, left-handed (counterclockwise) blade. In FIG. 7, the auxiliary body is not shown.

Figure 8:
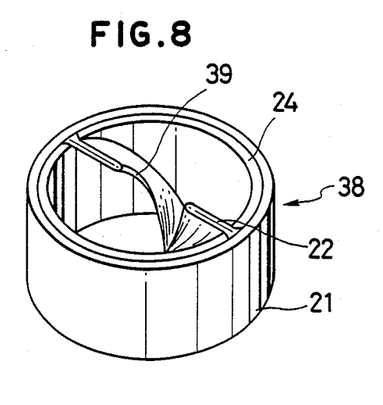
FIG. 8 is a perspective view of an element having a center notch.

Furthermore, element 38 shown in FIG. 8 may be used instead. In FIG. 8, like reference numerals are used to designate the same portions as are shown in FIG. 2. In element 38, notch 39 is formed at the central portion of 90°-twisted, right-handed blade 22. A column can be passed through notch 39. The distance between the end face of notch 39 and the inner peripheral surface of passage tube 21 is fixed. While passing through one such element 38, the circulating gases undergo division and mixture, thus ensuring a further improved fluid mixture effect.

Figure 9:
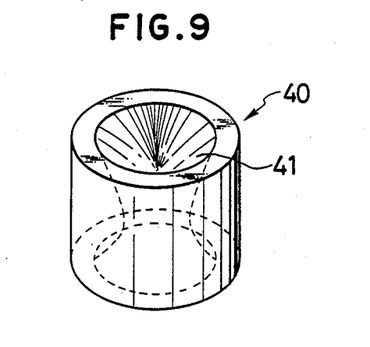
FIG. 9 is a perspective view of a spacer.

FIG. 9 shows spacer 40 which is substantially in the form of a cylinder having the same outside diameter as the element. Spacer 40 has its inside diameter reduced in the middle, with respect to the longitudinal direction thereof, so that the inside of the spacer is constricted.

Figure 10:
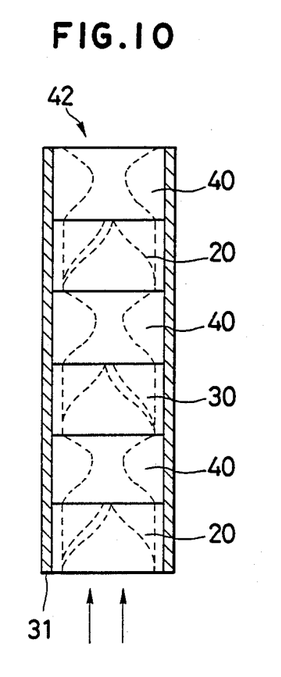
FIG. 10 is a sectional view showing a removing apparatus incorporating the spacers.

FIG. 10 shows removing apparatus 42 which uses spacers 40. Right-handed elements 20 and left-handed elements 30 are arranged alternately inside pipe 31 so that the facing end edges of their blades extend at right angles, and spacer 40 is interposed between each adjacent pair of elements 20 and 30.

In removing apparatus 42, the gas spirally rotates clockwise through 90° as it flows through element 20. Thereafter, the gas flows through spacer 40 to be throttled once. Then, it spirally rotates counterclockwise through 90° as it flows through element 30. Thus, with use of spacers 40 between the elements, the gas mixture effect can be further improved. Naturally, an auxiliary body, such as a porous body, may be disposed on the inner surface of spacer 40. The construction or configuration of each element is not limited to the embodiment described above. The element may alternatively be a motionless mixer which is composed of a gas passage structure without any mechanical moving parts. In this passage structure, which includes a passage tube with a gas passage therein, gases can be mixed for a wide range of Reynold's number. In such a motionless mixer, for example, flat blades may be arranged inside the passage tube.

Figure 11:
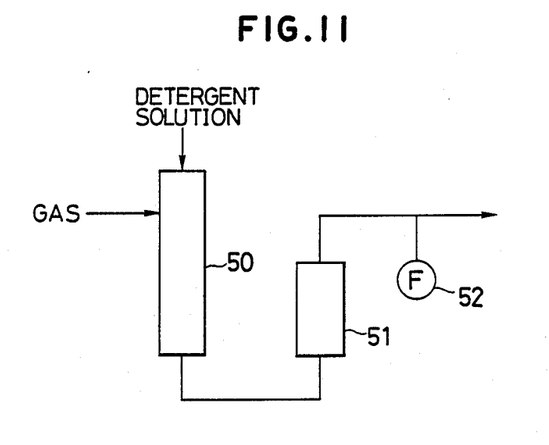
FIG. 11 is a block diagram showing a deodorizing apparatus to which is applied a removing apparatus according to a second embodiment of the present invention.

Referring now to FIG. 11, a second embodiment of the present invention will be described. According to this embodiment, the invention is applied to a deodorizing apparatus. A gaseous body may contain malodorous substances, such as ammonia gas, trimethylamine, methyl mercaptan, hydrogen sulfide, etc. Also, offensive odors may be emitted from rubber, formalin, etc.

As shown in FIG. 11, a gas body containing these malodorous substances is fed into removing apparatus 50 according to the second embodiment through the top portion thereof. Apparatus 50 has the same construction as removing apparatuses 1 and 7 according to the first embodiment. More specifically, each element of apparatus 50 includes a passage tube, spiral blade disposed inside the tube, and an auxiliary body, such as a meshed body, provided on the inner peripheral surface of the tube. Composed of a plurality of such elements connected in series, removing apparatus 50 is positioned upright. A detergent solution containing deodorant substances is fed into apparatus 50 through its top portion, and flows through the passage tube. The detergent solution touches the gas to be mixed therewith in removing apparatus 50, thereby absorbing and removing the malodorous substances from the gas. After water in the gas is removed by means of gas-liquid separator 51, the gas is sucked and discharged into the atmosphere by exhauster 52.

Also in this embodiment, the malodorous substances or foreign substances in the gas can be removed effectively. While flowing through the element, whose contact area is extended by the use of the auxiliary body, the gas and the detergent solution are mixed together and brought into contact with each other. The auxiliary body serves to improve the efficiency of contact between the gas and the detergent solution, so that the malodorous substances can be effectively removed from the gas.

In the first and second embodiments, the gas and the liquid flow in the same direction (parallel flow) in the passage tube. Alternatively, however, they may be caused to flow in opposite directions.

A third embodiment of the present invention will now be described. According to this embodiment, the invention is applied to an exhaust control apparatus of an automobile or the like. Like the apparatus of the embodiment shown in FIG. 3, the exhaust control apparatus of this embodiment comprises right-handed elements 20 and left-handed elements 30 arranged alternately. This apparatus is provided in the middle of an exhaust pipe so that exhaust gas is passed through the apparatus. In this case, the blades, passage tubes, and auxiliary bodies are formed from metal or ceramic material which enables catalytic action. Thus, nitrogen oxide (NOx) and the like in the exhaust gas can be removed without obstruction while the gas is flowing through the control apparatus. Further, the exhaust control apparatus can capture and purify particulates of carbon and the like in the exhaust gas, and also serve as a muffler.

Catalysts adapted to be carried by the passage tubes, blades, and auxiliary bodies include simple noble metal such as platinum or alkaline metal salts thereof, alkali earth metal salts, metal salts such as molybdate or silver salt, soluble salts of rare earth elements, etc., for example. Usually, elements 20 and 30 are immersed in a water solution of these metal salts as frequently as necessary, dried, and then sintered. Thus, the catalyst is carried by the passage tubes, blades, or auxiliary bodies of elements 20 and 30. Alternatively, a necessary quantity of catalytic water solution may be injected through a spray nozzle and applied to the passage tubes, blade, and auxiliary bodies. In this case, these members are caused to carry the catalyst by being dried and sintered. Alternatively, moreover, the catalytic metal material itself may be heated, evaporated, and condensed, without using the water solution, so that particulates of catalytic metal are carried on the auxiliary bodies and the like. The purification efficiency of the apparatus can be further improved by forming also the passage tubes and the blades from porous material.

What is claimed is:

1. An apparatus for removing foreign substances in a gas, comprising:
   a plurality of right-handed elements, each of the elements having a passage tube through which the gas flows, a spiral blade twisted in the clockwise direction and dividing the inside of the passage tube into a plurality of gas passages, and an auxiliary porous body connected to the passage tube;
   a plurality of right-handed elements, each of the elements having a passage tube through which the gas flows, a spiral blade twisted in the clockwise direction and dividing the inside of the passage tube into a plurality of gas passages, and an auxiliary porous body connected to the passage tube;
   a plurality of left-handed elements, each of the elements having a passage tube through which the gas flows, a spiral blade twisted in the counterclockwise direction and dividing the inside of the passage tube into a plurality of gas passages, and an auxiliary porous body connected to the passage tube, the left-handed elements and right-handed elements having arranged alternately with their passage tubes connected;
   injecting means for injecting a liquid into the elements, and
   collecting means for collecting the liquid passed through the elements.

2. The apparatus according to claim 1, wherein said porous auxiliary body is a cylindrical body formed of a meshed material.

3. The apparatus according to claim 1, wherein said porous auxiliary body is a cylindrical body having an indented inner surface.

4. The apparatus according to claim 1, wherein said porous auxiliary body is a laminate structure composed of a fine porous body, located on the inner peripheral surface of the passage tube, and a coarse porous body disposed inside the fine porous body and having pores coarser than those of the fine porous body.

5. The apparatus according to claim 1, wherein said auxiliary porous body is disposed at a suitable distance from the inner peripheral surface of the passage tube.

6. The apparatus according to claim 1, wherein said porous auxiliary body is a laminate structure composed of an indented cylindrical body, located on the inner peripheral surface of the passage tube and having an indented inner surface, and a meshed body disposed inside the indented cylindrical body.

7. The apparatus according to claim 1, wherein said porous auxiliary body is bonded to the inner peripheral surface of the passage tube.

8. The apparatus according to claim 1, wherein each blade is formed integrally with its respective passage tube.

9. The apparatus according to claim 8, wherein the opposite end edges of each blade twisted in the clockwise direction extends, with respect to the axial direction of the passage tube at right angles to each other.

10. The apparatus according to claim 8, wherein the opposite end edges of each blade twisted in the counterclockwise direction extends, with respect to the axial direction of the passage tube, at right angles to each other.

11. The apparatus according to claim 8 wherein the opposite end edges of each blade twisted in the clockwise direction extends, with respect to the axial direction of the passage tube parallel to each other.

12. The apparatus according to claim 8, wherein the opposite end edges of each blade twisted in the counterclockwise direction extends, with respect to the axial direction of the passage tube parallel to each other.

13. The apparatus according to claim 8, further comprising a spacer passage tube for the passage of gas interposed between each two adjacent elements.

14. The apparatus according to claim 13, wherein each spacer passage tube is cylindrical and has its inside diameter reduced at the central portion with respect to the longitudinal direction thereof.

15. An apparatus for removing foreign substances in a gas, comprising:
   a plurality of right-handed elements, each of the elements having a passage tube through which the gas flows, a spiral blade twisted in the clockwise direction and dividing the inside of the passage tube into a plurality of gas passages, and an auxiliary porous body connected to the outer edge of the blade.
   a plurality of left-handed elements, each of the elements having a passage tube through which the gas flows, a spiral blade twisted in the counterclockwise direction and dividing the inside of the passage tube into a plurality of gas passages, and an auxiliary porous body connected to the outer edge of the blade; the left-handed elements and right-handed elements being arranged alternatively with their passage tubes connected;
   injecting means for injecting a liquid into the elements; and
   collecting means for collecting the liquid passed through the elements.

16. The apparatus according to claim 15, wherein said porous auxiliary body is a cylindrical body formed of a meshed material.

17. The apparatus according to claim 15, wherein said porous auxiliary body is a cylindrical body having an indented inner surface.

18. The apparatus according to claim 15, wherein said porous auxiliary body is a laminate structure composed of a fine porous body and a coarse porous body disposed inside the fine porous body and having pores coarser than those of the fine porous body.

19. The apparatus according to claim 15, wherein said porous auxiliary body is disposed at a suitable distance from the inner peripheral surface of the passage tube.

20. The apparatus according to claim 15, wherein said porous auxiliary body is a laminate structure composed of an indented cylindrical body having an indented inner surface, and a meshed body disposed inside the indented cylindrical body.

21. The apparatus according to claim 5, wherein the opposite end edges of each blade twisted in the clockwise direction extends, with respect to the axial direction of the passage tube at right angles to each other.

22. The apparatus according to claim 15, wherein the opposite end edges of each blade twisted in the counterclockwise direction extends, with respect to the axial direction of the passage tube, at right angles to each other.

23. The apparatus according to claim 15, wherein the opposite end edges of each blade twisted in the clockwise direction extends, with respect to the axial direction of the passage tube parallel to each other.

24. The apparatus according to claim 15 wherein the opposite end edges of each blade twisted in the counterclockwise direction extends, with respect to the axial direction of the passage tube parallel to each other.

25. The apparatus according to claim 15, further comprising a spacer passage tube for the passage of gas interposed between each two adjacent elements.

26. The apparatus according to claim 25, wherein each spacer tube is cylindrical and has its inside diameter reduced at the central portion with respect to the longitudinal direction thereof.

* * * * *